FIG. 5.

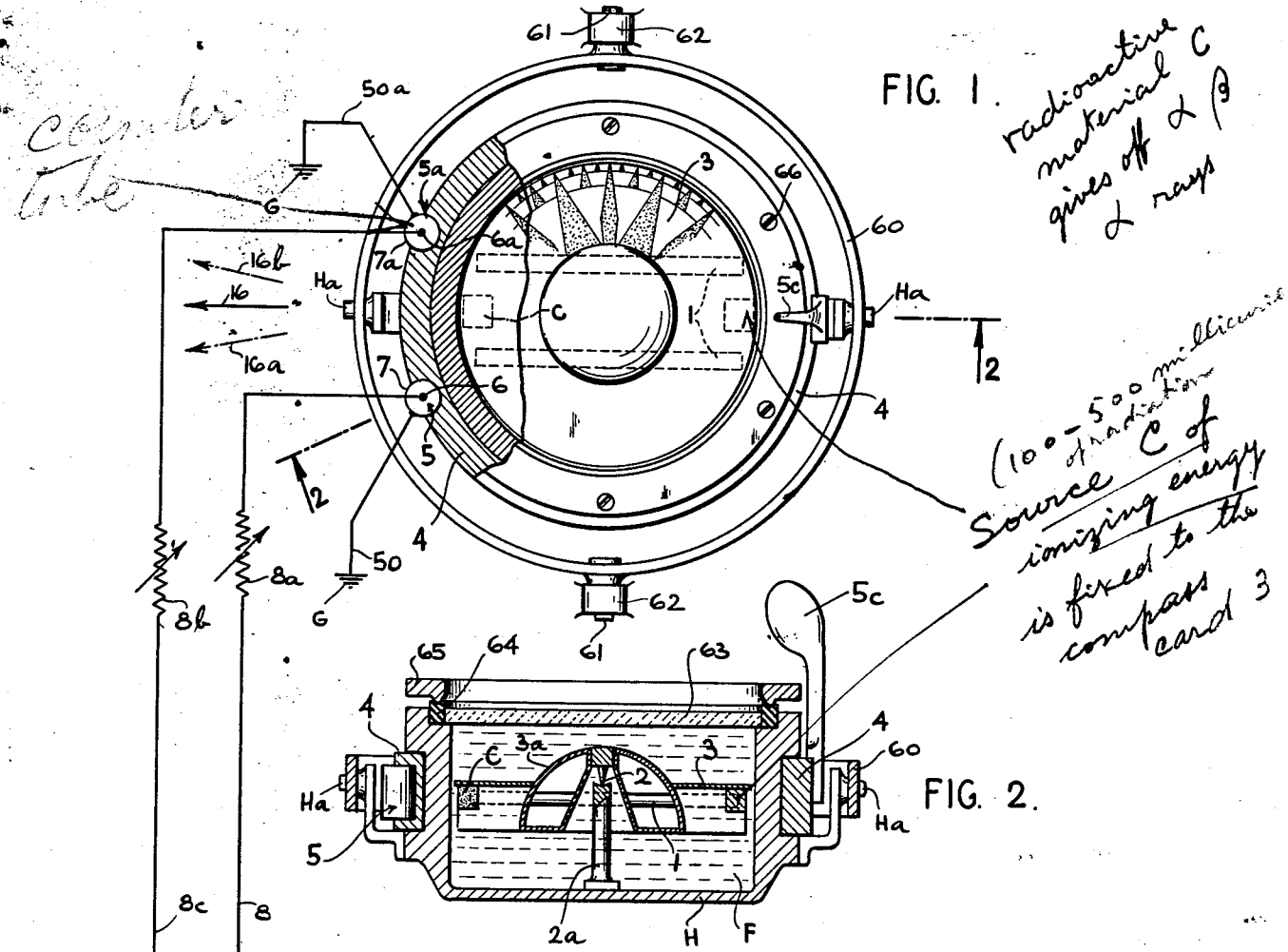

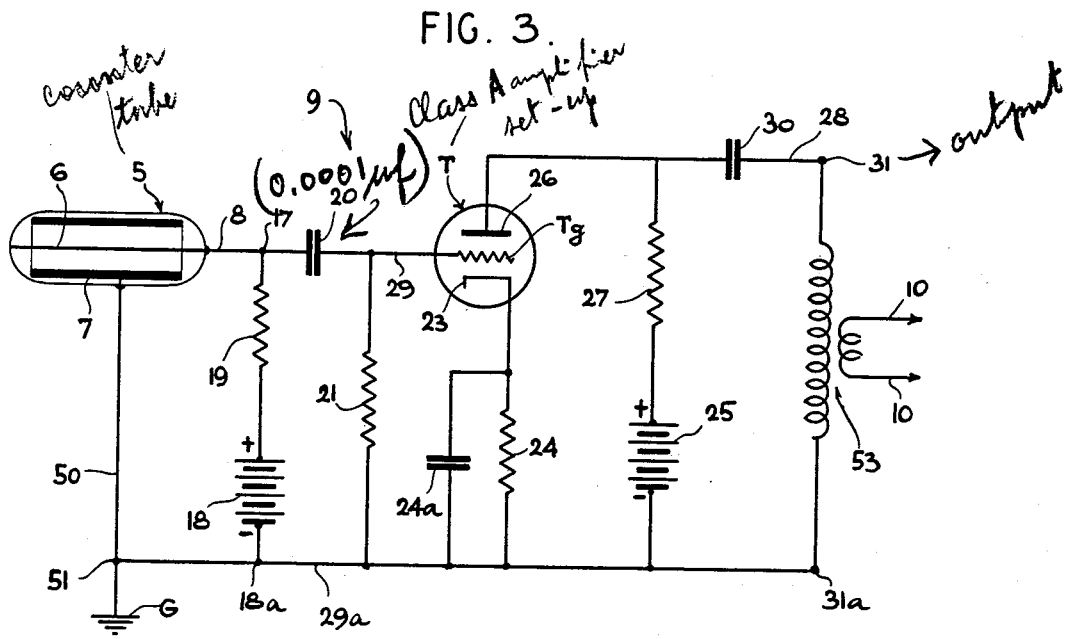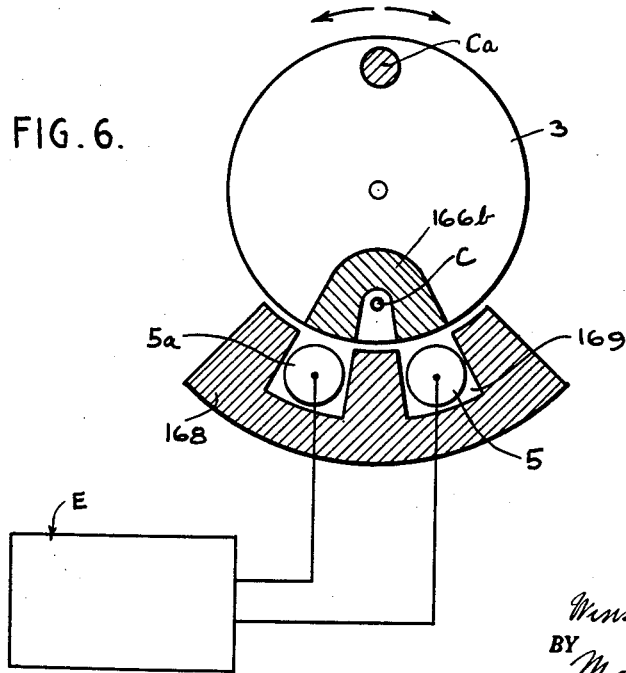

Patented Dec. 8, 1953

2,662,208

UNITED STATES PATENT OFFICE 2,662,208

RADIOACTIVE DETECTOR MEANS IN AUTOMATIC STEERING SYSTEMS

Winston Wells, New York, N. Y., assignor to Canadian Radium & Uranium Corporation, New York, N. Y., a corporation of New York Application December 21, 1949, Serial No. 134,265

10 Claims. (Cl. 318—489)

This invention relates to new and improved control apparatus and to a new and improved control method for controlling the position of a body, the direction of movement of a body, and for other purposes. The improved apparatus and method utilize radiated energy, and one or more detectors of radiated energy.

The radiated energy is preferably of the ionizing type, such as gamma rays. The detectors are preferably Geiger-Müller tubes, also designated as counter tubes. The counter tubes may be of the quenching or non-quenching type. The source of radiated energy is preferably radium or other radio-active material which emits ionizing rays.

As is well-known, a counter tube consists of a fine wire electrode which is located on the axis of a cylindrical electrode. These electrodes are located in a tube which contains a suitable gas at suitable low pressure. Said gas pressure may be 2 to 10 centimeters of mercury. A unidirection voltage, which may be 300 volts to 2,000 volts, is applied to these electrodes. The axial wire electrode may be either the cathode or the anode. This applied voltage is less than the voltage which is required to start an ionization discharge through the gas. When the gas is ionized, even slightly, by means of an ionizing radiation such as alpha rays or beta rays or gamma rays, the gas is cumulatively ionized. The internal or plate resistance of the counter tube thus drops to a low value, and a large ionization current flows through the gas between the electrodes.

When radium or other radio-active material is used as the source of ionizing energy, it emits ionizing pulses of irregular energy at irregular intervals.

In the non-quenching counter-tube, the ionization discharge current continues after it has been started, unless the applied voltage is lowered to extinguish the discharge.

The quenching type of counter tube contains a suitable vapor in addition to its gaseous filling. As one example, such vapor is the vapor of ethyl alcohol. In this quenching type of counter tube, the ionization current is self-interrupted after it has flowed during a short period, without changing the applied voltage.

For many purposes, it is desirable to use the non-quenching type of counter tube, because of its longer life and other advantages.

Some of the purposes of the invention are to control the direction of movement of a ship, an airplane, a torpedo, a rocket and other jet-propelled moving objects. The invention is also generally useful for all control purposes, particularly remote control, as the control of a movable valve or other control part of an engine, etc.

As one element of the invention for certain purposes, I use a compass which may be of the magnetic type or the gyroscope type. In other embodiments of the invention, it is not necessary to use a compass.

Additional objects and advantages and features of the invention are stated in the annexed description and drawings, which illustrate preferred embodiments of the invention.

Fig. 1 illustrates a first embodiment which is used for controlling the direction of movement of a ship;

Fig. 2 is a section on the line 2—2 of Fig. 1;

Fig. 3 is a diagrammatic drawing of the circuit of the first embodiment. Quenching counter tubes are used in this first embodiment;

Fig. 5 is a continuation of Fig. 4, from left to right; and

Fig. 6 illustrates another embodiment which utilizes shielding means.

*First embodiment.—Figs. 1, 2, 3*

Figure 4:
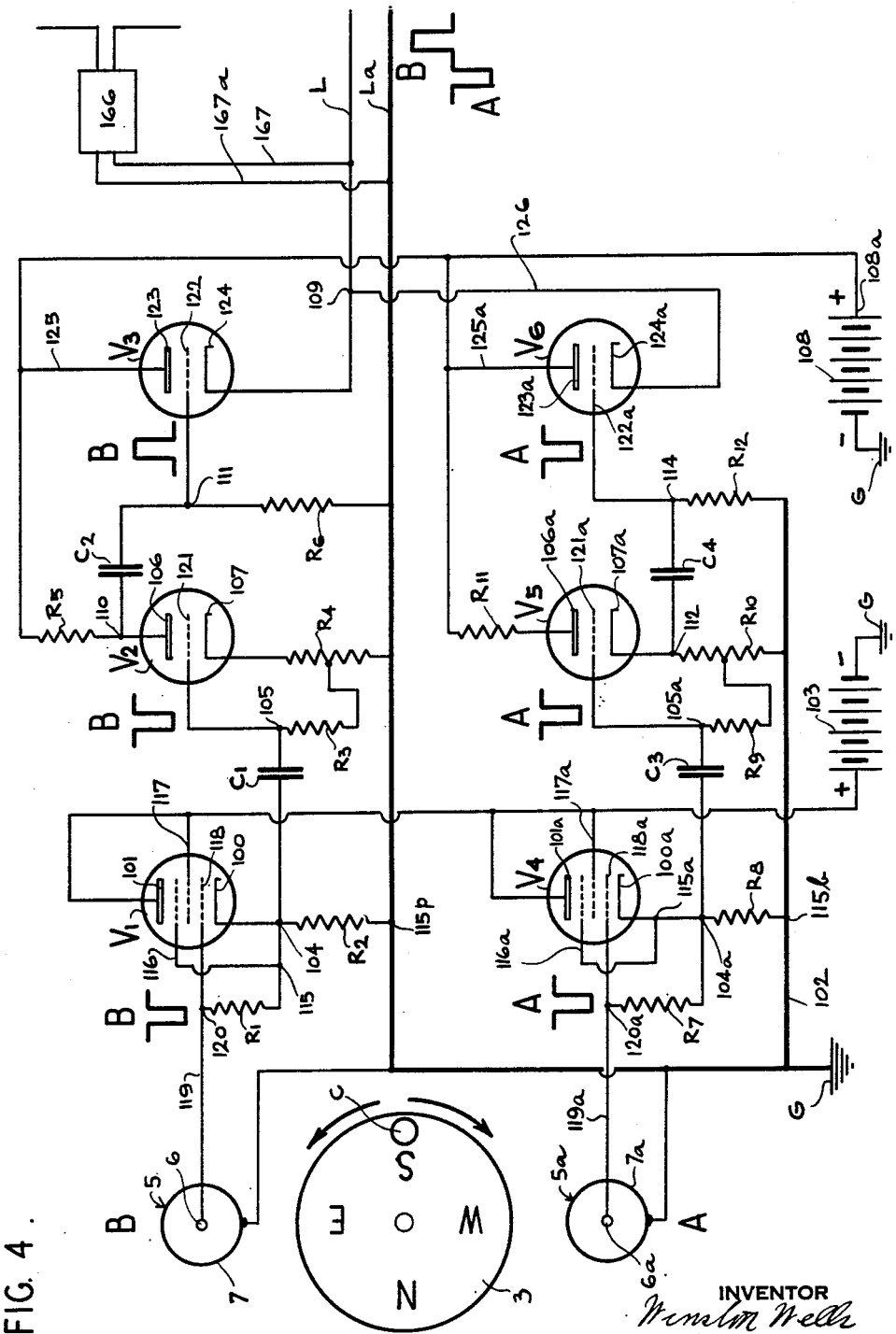
Fig. 4 is a part of a diagram of another circuit which uses non-quenching counter tubes.

Figs. 1 and 2 show certain well-known details of the magnetic mariner's compass.

The magnets 1 are fixed to the bottom face of a horizontal compass card 3, which is fixed to a bearing 3a, to which a vertical pivot 2 is fixed. This vertical pivot 2 is located turnably on a vertical bearing 2a, which is fixed to the bottom wall of a housing H. This housing H is optionally filled with the usual fluid F. The top of housing H is closed by a cover 63. Gasket 64 is fixed to cover 63. Gasket 64 is held under pressure in sealing position by a pressure ring 65, which is fixed to housing H by screws 66, which maintain the necessary pressure on gasket 64.

It is assumed that the compass card 3 is maintained in a horizontal plane or in a plane which is substantially horizontal.

The housing H has the usual laterally disposed pivots Ha which turnably connect housing H to inner ring 60. Said inner ring 60 has pivots 61, which turnably connect inner ring 60 to the longitudinally disposed bearings 62, which are fixed to the ship. The bearings 62 may be part of a longitudinal ring which is fixed to the ship.

The above-described parts of a mariner's compass of the magnetic type are well-known.

According to this invention, a source C of ionizing energy is fixed to compass card 3. This source C may be a mass of radium which emits ionizing rays, namely, alpha and beta and gamma rays.

Any other source of one or more ionizing radiations may be used.

Since the card 3 is connected to the ship by a universal joint connection, the radius of card 3 to source C will maintain a fixed direction when the ship turns.

Ring 4 is turnably mounted in a recess of the vertical wall of housing H, so that ring 4 is turnable around the vertical axis of pivot 2 relative to housing H. When ring 4 has been turned to a selected position relative to housing H, said ring 4 may be releasably fixed to housing H. Ring 4 is turned relative to housing H by a handle 5c, which may be operated by hand or by a remote control device.

Counter tubes 5a and 5 are fixed to ring 4. In this embodiment, said counter tubes 5 and 5a are of the self-quenching type. In their positions shown in Fig. 1, the counter tubes 5 and 5a are equidistant from source C. Such positions of the counter tubes 5 and 5a are designated as their equilibrium position.

The identical counter tubes 5a and 5 have respective cylindrical metal electrodes 7a and 7, and respective straight wire electrodes 6a and 6 which are coincident with the respective axes of the cylindrical metal electrodes 7a and 7. In this embodiment, the axial wire electrodes 6a and 6 are the anodes, and the cylindrical metal electrodes 7a and 7 are grounded cathodes. This relation may be reversed, so that the electrodes 6a and 6 may be the respective cathodes, which are optionally and preferably grounded.

Since it is preferred to use gamma rays as the ionizing rays, the cylindrical metal electrodes 7a and 7 are made sufficiently thick to block alpha rays and beta rays. I can use any type of ionizing ray or ionizing energy.

The respective cylindrical cathodes 7a and 7 are connected to respective wires 50a and 50, which are connected to ground connections G, such as the metal hull of the ship.

The respective axial wire electrodes 6a and 6 are connected through respective adjustable resistors 8b and 8a and respective wires 8c and 8, to respective positive terminals 17 and 17a of respective identical power supply and amplifier units 9 and 9a.

Fig. 3 shows the circuit of unit 9 and its connection to the respective counter tube 5.

The positive terminal 17 of unit 9 is connected through a resistor 19 to the positive terminal of a battery 18 or other source of constant and unidirectional voltage. The negative terminal of battery 18 is connected to the point 18a of a wire 29a, which is connected to a ground connection G, as by connection to point 51 of the wire 50 which connects electrode 7 to ground at point G.

As one example, the potential of battery 18 is 900 volts, and the resistance of resistor 19 is 2 megohms.

The positive terminal 17 is coupled to wire 29 through a condenser or capacitor 20. In this example, the capacity of condenser 20 is 0.0001 microfarad.

Wire 29 is connected to the control grid Tg of the usual highly evacuated amplifier electronic tube T, which has a plate or anode 26 and the usual heated, electron-emitting cathode 23. Fig. 3 shows only one stage of amplification. Two or more amplifying stages may be used, and the amplifier tube or tubes may be of any type.

Cathode 23 is connected to the grounded wire 29a through a resistor 24, which is shunted by a condenser 24a.

Between condenser 20 and tube T, the wires 29 and 29a are connected by a resistor 21.

Plate current is supplied to tube T by a plate battery 25, whose positive terminal is connected to anode 26 through a resistor 27, and whose negative terminal is connected to the grounded wire 29a.

The tube T is preferably operated as a class A amplifier, through which current flows at all times from the plate battery 25. When zero ionization current flows through the counter tube 5, the control grid Tg is negative relative to cathode 23, because zero current then flows through resistor 21, control grid Tg is then at ground or zero potential, and resistor 24 maintains cathode 23 at a selected positive potential relative to ground potential.

The positive terminal of the plate battery 25 is connected through condenser 30 and wire 28 to an output terminal 31 of unit 9. The negative terminal of battery 25 is connected to the other output terminal 31a of unit 9. Said output terminals 31 and 31a are connected by the primary coil of a transformer 53. The ends of the secondary coil of transformer 53 are respectively connected to respective wires 10.

Instead of using the biasing resistor 24 to maintain a normal selected difference of potential between control grid Tg and cathode 23, the usual biasing battery or C-battery may be used. In such case condenser 24a may be omitted.

During each period in which counter tube 5 remains non-ionized and non-conductive, with resultant maximum internal resistance, battery 18 will charge condenser 20 in a charging circuit which includes resistors 18 and 21. For convenience, the direction of current flow is assumed to be from the positive terminal of battery 18 to its negative terminal, namely, in a direction opposed to electron flow. Each pulse of charging current of condenser 20 will flow downwardly through resistor 21, thus decreasing the negative potential bias of control grid Tg relative to cathode 23, and thus increasing the current through electronic tube T.

During each period in which counter tube 5 is ionized, condenser 20 will discharge through a discharge circuit which consists of counter tube 5 and resistor 21, thus sending an upward current through resistor 21 and increasing the negative potential bias of control grid Tg relative to cathode 23, and thus decreasing the current through electronic tube T.

An alternating output current is thus induced in the secondary coil of transformer 53. This output current, optionally rectified, is delivered to a servo-motor S.

Since the unit 9a is identical with unit 9, the above description applies. The output of unit 9a is delivered through wires 10a to servo-motor Sa.

When the counter tubes 5 and 5a are spaced equally from source C, the respective servo-motors S and Sa will exert equal and opposed pulling forces on their respective movable actuated members or rods 11 and 11a, subject to irregularities in the delivery of respective ionizing pulses from source C to the respective counter tubes 5 and 5a.

The servo-motors S and Sa may be solenoids, in which case the pull members 11 and 11a are the respective solenoid plungers.

The members 11 and 11a are pivotally connected by respective links 12 and 12a to the common pivot point 14 of a rudder R, which is pivoted at 15 to the ship.

When the counter tubes 5 and 5a are equidistant from source C, rudder R will be maintained in its full-line position of Fig. 1, and the ship will move in the direction 16, which is the selected direction.

If the ship turns counterclockwise from the selected direction 16 to the undesired direction 16a, the ring 4, which is then fixed to housing H, will then turn in unison with housing H and the ship around the vertical axis of pivot 2, counterclockwise from the position of Fig. 1. The radial direction of source C will remain unchanged, because the compass card 3 does not turn in unison with the ship.

The result will be to decrease the distance between counter tube 5a and source C, and to increase the distance between counter tube 5 and source C.

The member 11a will thus exert a greater pull than member 11 and rudder R will be turned clockwise from the full-line position of Fig. 1 to the position Ra. In its position Ra, the rudder will be operable to turn the ship clockwise, until it again moves in the selected direction 16.

If the ship turns clockwise off the selected direction 16, as to the undesired direction 16b, ring 4 will be turned clockwise relative to source C, thus increasing the radiated energy of source C which is received by counter tube 5 and decreasing such radiated energy which is received by tube 5a, so that tube 5 will have more ionizing pulses than tube 5a. This will increase the power input of servo-motor S relative to the power input of servo-motor Sa, so that member 11 will exert a greater pulling force than member 11a, and the rudder will be turned to the direction Rb, thus turning the ship counterclockwise until it again moves in the selected direction 16.

Hence one of the counter tubes 5 and 5a will receive successive ionizing pulses at greater frequency than the other, until the course of the ship is corrected to the desired course.

Instead of delivering successive and intermittent current pulses to the servo-motors S and Sa, the respective connecting lines 10 and 10a may include the usual condensers and filter elements so that each servo-motor S and Sa will receive a steady current whose value will vary with the rate at which current pulses are supplied to said connecting lines 10 and 10a.

If it is desired to change the selected course of the ship from the course 16 to a new selected course, such as 16a, the ring 4 is temporarily released from housing H, and said ring 4 is turned slowly in a clockwise direction around the vertical axis of pivot 2, relative to housing H and the ship, so that the distance between counter tube 5a and source C is increased, and the distance between counter tube 5 and source C is decreased. The rudder R will thus be turned to position Rb, thus turning the ship clockwise. When the ship is moving in the new selected direction 16b, ring 4 is again fixed to housing H.

The radiation output of source C will depend upon the size of the ship. Such radiation output may be from 0.1 millicurie to 0.5 millicurie and even several millicuries. Such radiation output should be sufficiently high to minimize irregularities in the period and energy of ionizing pulses which are received by the counter tubes 5a and 5, so that the members 11 and 11a will exert opposed forces which are equal or substantially equal, when the counter tubes 5a and 5 are equidistant from source C.

Also, if the apparatus is used for keeping a ship or other moving object on a selected course, the source C should have sufficient radiation output to produce the desired correction before the ship or other moving object has moved too far off its selected course.

As applied to moving objects other than ships, the member R may be any member which is movable relative to the body of the moving object, such as an aileron or elevator of an airplane, or any adjustable member or surface of an airplane, a torpedo, a rocket, etc.

Also, the member R may actuate the fuel valve or other part of an engine, the movable arm of a rheostat or any other control part.

In many cases, the compass may be omitted, and source C can be fixed to housing H or to any support. Thus, if member R operates the fuel inlet valve of an internal combustion engine, it is sufficient to turn ring 4 relative to source C, while source C is fixed to the frame of the engine or to any other support.

While the counter tubes 5 and 5a could be fixed to compass card 3 and source C could be fixed to ring 4, it is preferred to locate the counter tubes 5 and 5a and source C, as shown in Fig. 1.

While the use of two counter tubes is greatly preferred, it is possible to use only one counter tube. Thus, if counter tube 5 and its unit 19 are eliminated, the servo-motor S could be replaced by a spring or other device which will exert the same pull on its link 12 as servo-motor Sa, when tubes 5 and 5a are equidistant from source C.

A gyroscope or gyro-compass can replace the magnetic compass. In such case, the source C may be fixed to the axial part of the casing in which the rotor of the gyroscope is mounted, and ring 4 is mounted turnably on said casing.

Figure 5:
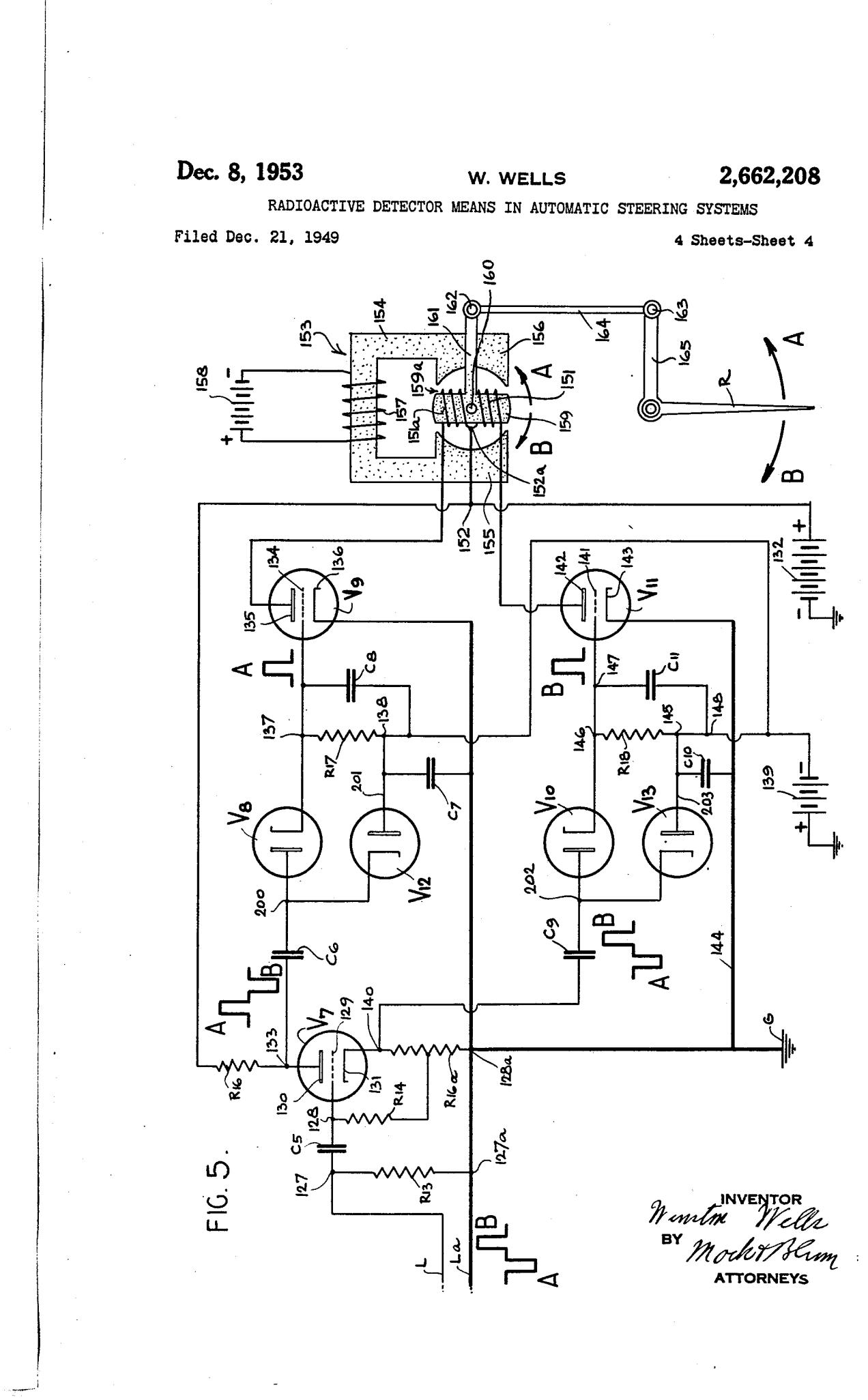

*Fig. 4 and Fig. 5*

The respective ground terminals are indicated by the reference letter G.

The specific figures stated below, as one example, are for the control of the direction of flight of a "DC-3" airplane. The source C may be a mass of radium whose activity is 100 millicuries to 500 millicuries, depending upon the amount of blocking of the gamma rays.

The negative terminal of a one-thousand volt battery 103 is grounded. The positive terminal of battery 103 is connected to the plates or anodes 101 and 101a of identical grid-controlled electronic tubes $V_1$ and $V_4$ may be triodes, or of any grid-controlled type, such tubes $V_1$ and $V_4$, in this embodiment, are pentodes of the type known as "6AK5" which are manufactured by Radio Corporation of America, with the connections later described herein. These pentodes "6AK5" are described at page 165 of "Radio Engineering" by F. E. Terman, published in 1947 by McGraw-Hill Book Company, Inc.

These pentodes "6AK5" are normally used with a plate voltage of 180 volts, a screen grid voltage of 120 volts, a control grid voltage of minus 1.5 volts and with a plate current of 7.7 milliamperes. Their normal plate resistance is 690,000 ohms.

As used in this circuit, the respective suppressor grids 116 and 116a of tubes V₁ and V₄ are connected respectively to the circuit points 115 and 115a, and hence to the respective cathodes 100 and 100a. The respective screen grids 117 and 117a are respectively connected to the anodes 101 and 101a. These connections have negligible resistance.

The electrodes 6 and 6a of the counter tubes 5 and 5a which are anodes in this embodiment, are respectively connected to the respective control grids 118 and 118a by respective wires 119 and 119a. The electrodes 7 and 7a are grounded.

The points 120 and 104 are connected by a resistor $R_1$, whose resistance is selected in a range of 5 megohms to 10 megohms.

The points 120a and 104a are connected by a resistor $R_7$, whose resistance is equal to that of resistor $R_1$.

The point 104 is connected to point 115p of the grounded transmission wire La, by a resistor $R_2$, whose resistance is selected in a range of one megohm to two megohms.

The point 104a is connected to point 115b of the grounded wire 102 through resistor $R_8$, whose resistance is equal to that of resistor $R_2$.

Point 104 is connected to one terminal of condenser or capacitor $C_1$, whose capacity is 0.001 microfarad.

The other terminal of condenser $C_1$ is connected to point 105, and through resistor $R_3$, whose resistance is one megohm, and through a selected part of resistor $R_4$, to the grounded line La.

Point 104a is connected to one terminal of condenser $C_3$, whose capacity is 0.001 microfarad.

The other terminal of condenser $C_3$ is connected to point 105a, and also to the grounded wire 102 through resistor $R_9$, whose resistance is one megohm, and through a selected part of resistor $R_{10}$.

The points 105 and 105a are respectively connected to the respective control grids 121 and 121a of identical grid-controlled electronic tubes V₂ and V₅, which have respective anodes or plates 106 and 106a, and respective cathodes 107 and 107a.

Plate current is supplied to tubes V₂ and V₅ by a two hundred volt battery 103, whose negative terminal is grounded. These respective plate connections include respective resistors $R_5$ and $R_{11}$, each having a resistance of 20,000 ohms.

Point 110 is connected to one terminal of condenser $C_2$, whose capacity is 0.001 microfarad. The other terminal of condenser $C_2$ is connected to point 111, and also to the grounded transmission wire La through resistor $R_6$, whose resistance is 100,000 ohms.

Point 112 is connected to one terminal of condenser $C_4$, whose capacity is 0.001 microfarad. The other terminal of condenser $C_4$ is connected to point 114, and also to the grounded wire 102 through resistor $R_{12}$, whose resistance is 100,000 ohms.

The identical grid-controlled electronic tubes V₃ and V₆ have respective anodes 123 and 123a, respective control grids 122 and 122a, and respective cathodes 124 and 124a. The anodes 123 and 123a are connected by respective wires 125 and 125a to the positive terminal 108a of battery 108 whose negative terminal is grounded.

The cathode 124 of tube V₃ is connected to the ungrounded transmission wire L. Point 109 of the ungrounded transmission line L is connected to cathode 124a of tube V₆ by a wire 126.

The point 127 of the ungrounded transmission wire L is connected to point 127a of the grounded transmission wire La by resistor $R_{13}$, whose resistance is one thousand ohms.

Point 127 of wire L is connected to point 128, through a condenser $C_5$, whose capacity is 0.01 microfarad.

Point 128 is connected to point 128a of wire La, through a resistor $R_{14}$, whose resistance is one thousand ohms, and through a selected part of resistor $R_{16a}$.

Point 128 is connected to the control grid 129 of an electronic tube V₇, which has an anode 130 and a cathode 131. Cathode 131 is connected to wire La through resistor $R_{16a}$, whose resistance is 5,000 ohms.

Anode 130 is connected to the positive terminal of a 400-volt battery 132, whose negative terminal is grounded. This anode connection includes resistor $R_{16}$, whose resistance is 5,000 ohms.

Point 133 is connected through condenser $C_6$, whose capacity is 0.1 microfarad, to the anode of an electronic diode V₈, whose cathode is connected to the control grid 134 of an electronic tube V₉, which has an anode 135 and a cathode 136. Said cathode 136 is connected to grounded transmission wire La.

The circuit point 137 is connected to wire La, through a ten thousand ohm resistor $R_{17}$, and a five microfarad condenser $C_7$.

The point 138 is connected to the negative terminal of a battery 139, whose positive terminal is grounded. The potential of battery 139 is 110 volts.

The point 140 is connected to a terminal of a condenser $C_9$, whose capacity is 0.01 microfarad. The other terminal of condenser $C_9$ is connected to the anode of an electronic diode V₁₀, which is identical with diode C₈. The cathode of diode V₁₀ is connected to circuit point 146. Said point 146 is connected through a resistor $R_{18}$, whose resistance is 10,000 ohms, to the ungrounded negative terminal of battery 139, whose positive terminal is grounded.

The point 145 is coupled to the grounded wire 144 through a five microfarad condenser $C_{10}$.

The points 146 and 147 are connected to the control grid 141 of an electronic tube V₁₁ which has a plate 142 and a cathode 143.

Points 147 and 148 are coupled by a condenser $C_{11}$, whose capacity may be one microfarad to 1000 microfarads.

The point 200 is connected to the cathode of a diode V₁₂, whose anode is connected to wire 201, which is connected to point 136. Said wire 201 is also coupled to grounded transmission line La through condenser $C_7$.

The point 202 is connected to the cathode of a diode V₁₃, whose anode is connected to wire 203. Said wire 203 is connected to point 145 and it is also coupled to grounded wire 144 through condenser $C_{10}$.

Tubes V₉ and V₁₁ are identical. Cathode 143 of tube V₁₁ is connected to grounded wire 144.

The device 153 conventionally represents an electric motor, which comprises an electro-magnet 154, which has a south pole 155 and a north pole 156. This electro-magnet 154 has a field coil 157, which is supplied with field current by battery 158.

The armature 159 is pivoted at 160. Said armature has a coil 159a whose central 152a point is connected to point 152.

Said coil 159a has respective halves 151 and 151a, which are wound oppositely. When equal currents are sent through said half-coils 151 and 151a, the armature 159 remains in its position of Fig. 4.

When unequal currents are sent through half-coils 151 and 151a, the armature 159 is turned clockwise or counterclockwise from its position of Fig. 4, depending upon which half-coil 151 or 151a receives more current.

An arm 161 is integral and rigid with armature 159.

Said arm 161 is pivotally connected at 162 to a link 164, which is pivotally connected at 163 to an arm 165 which is integral and rigid with rudder R.

The element 166 represents a source of unidirectional current pulses or alternating current. Said element 166 may be a transmitter, or it may be a receiver of electro-magnetic waves. Said element 166 has an output circuit which includes the wires 167 and 167a, which are connected respectively to wires L and La.

The tubes $V_2$, $V_5$, $V_3$, $V_6$ operate as class A amplifiers, in which plate current flows at all times, and the change in such plate current is substantially linear. Tubes $V_3$ and $V_6$ may operate as cathode followers, in which the output load is included in the cathode circuit, and the input is applied between the grid and the remote end of the cathode load. By taking the output in a cathode-follower vacuum-tube circuit between cathode and ground, using high input impedance and low output impedance, the gain may be less than unity.

When tubes 5a and 5 are non-ionized and non-conductive, the respective plate currents in tubes $V_1$ and $V_4$ are close to their maximum values. Tubes $V_1$ and $V_7$ operate as class A amplifiers.

Tubes $V_2$ and $V_5$ may operate only as repeaters, or as both repeaters and amplifiers.

The tubes $V_9$ and $V_{11}$ operate preferably as class B amplifiers, in which the normal grid bias is approximately equal to cut-off value, so that their plate currents are substantially zero when there is no input signal. Their plate currents correspond to the average values of the input signals over a given period of time.

For convenience, the current pulses which are produced by countertube 5 are designated as "B" positive pulses, and the current pulses which are produced by countertube 5a are designated as "A" negative pulses. These pulses may have the rectangular wave form shown in Fig. 4, or another wave form.

The tubes $V_1$, $V_2$, $V_3$, $V_4$, $V_5$, $V_6$, and $V_7$ have respective plate currents during each period in which the countertubes 5 and 5a are non-conducting.

When a current pulse is produced in tubes $V_1$ and $V_4$, the respective plate currents of said tubes $V_1$ and $V_4$ are decreased to cut-off, from an upper limit of plate current which is less than maximum plate current.

When a current pulse is produced in tubes $V_2$, $V_3$, $V_5$, $V_6$ and $V_7$, the respective variation is linear.

Whenever a respective factor is specified, this factor may be varied. Thus, every resistor may be a variable resistor and every condenser may be of variable capacity.

*Operation of circuit of Fig. 4 while counter tubes 5 and 5a are nonconductive*

TUBE $V_1$

Plate current flows at a normal selected constant value, which is less than maximum plate current. Control grid 118 and cathode 100 are at the same potential. As one example, the voltage drop through tube $V_1$ may then be 25 volts, with a resultant voltage drop of 975 volts through resistor $R_2$.

Zero current or negligible current flows through resistor $R_1$.

TUBE $V_4$

This is operated in the same manner as tube $V_1$, with a voltage drop of 975 volts, in this example, through resistor $R_8$.

CONDENSER $C_1$

This will be maintained at the normal constant potential difference across resistor $R_2$.

CONDENSER $C_3$

This will be maintained at the same normal constant potential as condenser $C_1$, since the voltage drop across resistor $R_8$ equals the voltage drop across resistor $R_2$.

TUBE $V_2$

Control grid 121 is at a selected negative potential relative to cathode 107. There are equal potential drops through the equal resistors $R_5$ and $R_4$. The cathode 107 is at above ground potential, and grid 121 is negative relative to cathode 107. The normal constant plate current is at substantially about 50% of its maximum value, in order to secure a straight line variation in said plate current.

TUBE $V_5$

This is operated in the same manner as tube $V_2$.

CONDENSER $C_2$

This is charged to normal constant potential, which is equal to the potential drop across tube $V_2$ and resistor $R_4$. The normal constant potential of this condenser $C_2$ exceeds one-half the potential of battery 108, namely, more than 100 volts in this example.

CONDENSER $C_4$

This is charged to normal constant potential, which is equal to the potential drop across resistor $R_{10}$. The potential of this condenser is less than one-half the potential of battery 108.

TUBE $V_3$

Since zero current flows through resistor $R_6$, control grid 122 is at zero or ground potential. Current then flows from the positive terminal of battery 108, through tube $V_3$ and line L to point 127 which is shown in Fig. 5, and through the one thousand ohm resistor $R_{13}$ to grounded wire La. Control grid 122 is therefore negative relative to cathode 124. The plate current is at approximately 50% of its maximum value.

TUBE $V_6$

Since zero current flows through resistor $R_{12}$, control grid 122a is at ground potential. Normal constant plate current flows through tube $V_6$ to point 109, and through line L and resistor $R_{13}$ to ground. Hence tubes $V_3$ and $V_6$ are under identical operating conditions.

RESISTOR $R_{13}$

The sum of the normal constant plate currents of tubes $V_3$ and $V_6$ flows through resistor $R_{13}$, so that the voltage drop across resistor $R_{13}$ is at normal constant value.

TUBE V₇

Control grid 129 is negative relative to cathode 131. Cathode 131 is above ground potential by the total voltage drop across resistor $R_{16a}$. The voltage drop between points 133 and 128a depends upon the ratio of the sum of the plate resistance of tube $V_7$ and the resistance of resistor $R_{16a}$, to the resistance of resistor $R_{16}$. The plate current is about 50% of maximum value.

CONDENSER C₆ AND DIODES V₈ AND V₁₂

Since point 133 is connected to the ungrounded positive terminal of battery 132, and the cathode of diode $V_8$ is connected to the ungrounded negative terminal of battery 139, condenser $C_6$ is charged to a normal potential which is equal to the potential drop of the circuit of battery 132 between the points 133 and 128a, plus the voltage of battery 139. The diode $V_{12}$ blocks the flow of current between points 200 and 138.

CONDENSER C₉ AND DIODES V₁₀ AND V₁₃

The condenser $C_9$ is charged to the potential drop of the circuit of battery 132 across resistor $R_{16a}$, plus the voltage of battery 139.

The diode $V_{13}$ blocks the flow of current between points 202 and 145.

CONDENSER C₈ AND TUBE V₉

The control grid 134 of tube $V_9$ is connected to point 137, which is connected through resistor $R_{17}$ to the ungrounded negative terminal of battery 139. Hence tube $V_9$ is blocked so that its plate current is zero. Condenser $C_8$ is at zero potential.

CONDENSER C₁₁ AND TUBE V₁₁

The control grid 141 of tube $V_{11}$ is connected to point 146, which is connected through resistor $R_{18}$ to the ungrounded negative terminal of battery 139. Hence tube $V_{11}$ is also blocked. Condenser $C_{11}$ is at zero potential.

CONDENSERS C₇ AND C₁₀

The condensers $C_7$ and $C_{10}$ are charged to zero potential, because charging current is blocked by the diodes $V_{12}$ and $V_{13}$.

ARMATURE 159

The respective currents through the half coils 151 and 151a are equal and provide equal and opposed electro-magnetic forces. Armature 159 remains in the neutral position of Fig. 4.

*Operation of Fig. 4 when counter tubes 5 and 5a receive ionizing pulses from source C*

As above noted, counter tubes 5 and 5a may receive unequal numbers of ionizing pulses from source C per unit of time, even when counter tubes 5 and 5a are equidistant from source C. Also, the respective ionizing pulses will vary in respective ionizing energy.

However, by using a sufficient large mass of radium or equivalent radio-active material, each counter tube 5 and 5a will receive the same number of ionizing pulses per second, or substantially the same number of ionizing pulses per second, for operating purposes, when said counter tubes are equidistant from source C. For example, each counter tube 5 and 5a may receive approximately 100,000 ionizing pulses per second. Since the counter tubes 5 and 5a are non-quenching in the embodiment of Fig. 4, it is necessary to lower the impressed voltage on each said counter tube to below the extinction voltage of the counter tube, at the end of a selected period after the respective received ionizing pulse has rendered the respective counter tube conductive. The counter tubes 5 and 5a are identical. When said counter tubes 5 and 5a are at unequal distances from source C, said counter tubes will receive unequal numbers of ionizing pulses per second, so that this circuit of Fig. 4 operates under the control of different numbers of ionizing pulses per second, received respectively by tubes 5 and 5a, like a counting circuit. Each ionizing pulse which is received by a respective counter tube 5 or 5a will exert the same effect, if such ionizing pulse has sufficient energy to make the respective counter tube conductive. For practical purposes, each ionizing pulse will make the respective counter tube conductive, until the ionization discharge is extinguished by lowering the applied voltage to below the extinction voltage of the counter tube.

*Effect of ionizing counter tube 5*

The voltage which is applied to counter tube 5, is the voltage drop between end-points 104 and 115p of resistor $R_2$.

A shunt circuit for the plate current of tube $V_1$ is provided from point 104, through resistor $R_1$ to point 120, through wire 119 to anode 6, through the ionized filling of counter tube 5 to its cathode 7, and to ground. This shunt current flows upwardly through resistor $R_1$, so that control grid 118 becomes sufficiently negative relative to cathode 100, to cut off the plate current of tube $V_1$, or to decrease said plate current to a negligible value or any desired value.

The voltage drop between end-points 104 and 115p of resistor $R_2$ will thus decrease to a voltage which is below the extinction voltage of counter tube 5, thus stopping the flow of current through tube 5 at the end of a selected period, until counter tube 5 receives the next ionizing pulse. The plate current of tube $V_1$ will be thus decreased in a respective pulse B. The period of pulse B will depend upon the selected factors. The amplitude and energy period of each pulse B will be constant and independent of the energy of the respective received ionization pulse, if said received ionization pulse is sufficient to start the ionization discharge through counter tube 5. Hence the number of successive pulses B per unit of time will depend or will depend substantially upon the number of received ionization pulses in counter tube 5.

Ionization pulses which are too feeble to start an ionization current through counter tube 5 may be ignored for practical purposes.

*Operation of condenser C₁ in response to a pulse B in tube V₁*

As above noted, each pulse B corresponds to a decrease of voltage difference between points 104 and 115p. Condenser $C_1$ will discharge in a discharge current which flows upwardly through resistor $R_3$ and a selected part of resistor $R_4$. The discharge of condenser $C_1$ may be a total discharge or a partial discharge up to 20% to 30% of its maximum discharge, so that said discharge current is substantially linear.

This condenser $C_1$ is recharged before the next pulse B is produced. During the period between successive pulses B, condenser $C_1$ may be recharged to its maximum potential. As an alternative, condenser $C_1$ may be recharged during said period to a potential which is less than its maximum potential.

When condenser $C_1$ is thus recharged, the recharging current flows downwardly through resistor $R_3$ and the selected lower part of resistor $R_4$.

Operation of tube $V_2$ in response to the change of potential of condenser $C_1$ The upward flow of discharge current of condenser $C_1$ through resistor $R_3$ impresses a negative bias upon control grid 121 relative to cathode 107, thus producing a decrease current pulse in the plate current of tube $V_2$. This pulse is designated as B, although it may differ in amplitude from the corresponding current pulse in tube $V_1$. Also the wave-form of the pulse in tube $V_2$ may be different than in tube $V_1$.

The recharging of condenser $C_1$ will restore the plate current of tube $V_2$ to its original selected value, or at least increase said plate current above its minimum value.

Operation of condenser $C_2$ in response to tube $V_2$

When the plate current of tube $V_2$ decreases, a higher voltage is impressed between point 110 and the grounded wire $L_a$. A charging current will flow into condenser $C_2$, downwardly through resistor $R_5$, thus increasing the positive bias of control grid 122 relative to cathode 124, and thus producing an increase current pulse through tube $V_3$. At the end of the decrease current pulse through tube $V_2$, condenser $C_2$ will discharge through tube $V_2$ and resistors $R_4$ and $R_6$, and the plate current of tube $V_3$ will decrease to its normal value, or at least below its maximum value of its increase pulse.

Effect of increase current pulse in tube $V_3$ at resistor $R_{13}$

Such increase current pulse will provide an increase downward current pulse in the 1000 ohm resistor $R_{13}$.

Effect of ionizing tube $5a$

Tubes $V_4$ and $V_5$ will respectively operate like their respective companion tubes $V_1$ and $V_2$.

However, condenser $C_4$ will discharge in response to a decrease current pulse of plate current in tube $V_5$, whereas condenser $C_2$ is charged in response to a decrease current pulse of plate current in tube $V_2$.

The discharge of condenser $C_4$ will produce an upward current in resistor $R_{12}$, thus increasing the negative bias of grid $122a$ of tube $V_6$ relative to its cathode $124a$, and thus producing a decrease current pulse of plate current in tube $V_6$. Hence tube $V_6$ is operated by a pulse A, oppositely to the operation of tube $V_3$ in response to a pulse B.

If a sufficiently large mass of radium is used as source C and the counter tubes 5 and $5a$ are equidistant from source C, the successive increase pulses of tube $V_3$ will be substantially equal in number, per unit of time, to the successive decrease pulses of tube $V_6$. Also, said respective increase and decrease pulses will be of equal energy.

As above noted, when there are no B or A pulses, the sum of the normal, constant plate currents of tubes $V_3$ and $V_6$ flows downwardly through resistor $R_{13}$, thus providing a normal constant and continuous downward current in resistor $R_{13}$.

If counter tube 5 is closer than counter tube $5a$ to source C, there will be an excess of B pulses and a resultant excess of increase pulses in tube $V_3$ over the decrease pulses of tube $V_6$ and the normal, constant and continuous downward current of resistor $R_{13}$ will be modulated by a succession of separated and downward increase pulses, which will represent the excess of the number of B pulses over A pulses per unit of time.

If counter tube $5a$ is closer than counter tube 5 to source C, there will be an excess of decrease pulses in tube $V_6$, and the normal constant and continuous current of resistor $R_{13}$ will be thus modulated.

Operation of condenser $C_5$ and tube $V_7$

When the current through resistor $R_{13}$ is increased above its normal value by an excess of B pulses over A pulses, a charging current is sent through condenser $C_5$. This charging current flows downwardly through resistor $R_{14}$ and the selected part of resistor $R_{16a}$, thus increasing the positive potential bias of control grid 129 relative to cathode 131 and increasing the plate current of tube $V_7$. Similarly, a decrease of current through resistor $R_{13}$ due to an excess of A pulses over B pulses will result in a partial or total discharge of condenser $C_5$, with an upwardly flowing discharge current through the selected part of resistor $R_{16a}$ and resistor $R_{14}$, with a resultant decrease of plate current through tube $V_7$.

Case 1

In this case, it is assumed that the plate current of tube $V_7$ has increased, due to the decrease of its internal or plate resistance. This will result in a decrease of voltage drop between points 133 and $128a$.

Condenser $C_6$ will discharge in a discharge circuit which consists of tube $V_7$, resistor $R_{16a}$, condenser $C_7$ whose value is not critical, and diode $V_{12}$ and battery 139. This discharge of condenser $C_6$ will not affect tube $V_9$.

This decrease of plate resistance of tube $V_7$ will increase the potential difference between points 140 and $128a$. This will result in charging condenser $C_9$ in a charging circuit which includes diode $V_{10}$, and resistor $R_{18}$. The charging current flows downwardly through resistor $R_{18}$, thus decreasing the negative bias of control grid 141 relative to cathode 143, so that a plate current will be sent through tube $V_{11}$ and its associated half-coil 151, thus turning armature 159 clockwise from its neutral position of Fig. 1. That is, an excess of B pulses over A pulses will turn armature 159 clockwise. Said coils 151 and $151a$ correspond to the coils of the solenoids S and $S_a$ of Fig. 1, or are equivalent to the coils of the solenoids S and $S_a$, to provide respective electro-mechanical operating devices which are coupled to the rudder or other movable member to move said movable member in respective opposed opposite directions.

Case 2

In this case, it is assumed that the plate current of tube $V_7$ has decreased, due to an excess of A pulses over B pulses, corresponding to the increase of the internal or plate resistance of tube $V_7$.

This will result in an increase of the potential of condenser $C_6$, in a charging pulse through diode $V_8$, and downwardly through resistor $R_{17}$, thus decreasing the negative bias of control grid 134 relative to cathode 136, thus unblocking tube $V_9$, so that the flow of its plate current through half-coil $151a$ will turn armature 159 counter-clockwise from its position of Fig. 4.

The increase in plate resistance of tube $V_7$ will decrease the potential drop in the circuit of battery 132 between the end points 140 and 128a of resistor R16a.

Condenser C9 will discharge in a discharge circuit which consists of resistor R16a, diode V13, condenser C10, and battery 139. This discharge of condenser C9 will not affect tube V11, which will remain blocked.

*Fig. 6*

The source C is mounted on the compass card 3, and a shield 166b, made of lead or other shielding material which blocks gamma rays is located partially around source C. Card C has a counterweight Ca to balance source C. The outer face of shield 166b is open. The shielding casing 168, which has recesses 169, is mounted on the ring 4 of the two previously described embodiments. The tubes 5a and 5 are mounted in said recesses, which are open at the compass card 3. Fig. 6 shows the wires which connect the axial wire electrodes of said tubes 5a and 5 to the electronic circuit E, which may be of either of the previously disclosed types. When the recesses 169 are located as shown in Fig. 6 so that the counter tubes 5a and 5 receive the same ionization energy or the same number of gamma ray ionization pulses from source C per unit of time, this is equivalent to the equilibrium positions of tubes 5a and 5 in the previously described embodiments.

When ring 4 is turnably shifted relative to source C, the shielding effect of shields 166 and 169 will have the same effect as the relative turning movement of ring 4 relative to source C, in the previously described embodiments. Fig. 6 therefore exemplifies the use of shielding means, in addition to varying the spacing of counter tubes 5a and 5 relative to source C. In the positions shown in Fig. 5, tubes 5a and 5 are equidistant from source C and the shields 166 and 169 are located relative to each other to equally and partially block the gamma rays in the paths between source C and tubes 5a and 5.

*Function of element 166*

When it is desired to vary the effect which is produced by a difference in the number of B and A pulses per second, pulses or continuous current waves or electrical input signals of any kind can be supplied to the line L—La by element 166. Also, if the system is in equilibrium, as when the armature is in its neutral position of Fig. 5, such equilibrium can be destroyed or modified by means of pulses or continuous current waves or electrical input signals of any kind, which are supplied by element 166. Said element 166 may supply successive pulses or other input signals of any desired frequency. Hence element 166 exemplifies a remote control device, in which the source of input signals may be carried upon the ship or airplane or other moving object or stationary object. Element 166 may be a receiver of input signals whose source is not carried upon the moving object or stationary object.

Without limitation thereto, I prefer to use gamma rays as the ionizing radiation, because these rays penetrate intervening objects better than alpha rays or beta rays.

While I greatly prefer to use an ionizing radiation or radiations as the control radiation, and to use counter tubes as receivers or detectors for said ionizing radiation, the invention is not limited thereto. Thus, if I use ionization rays as control energy, I can use ionization chambers as receivers or detectors. As examples of other types of control radiation, I refer to the entire range of electro-magnetic radiations, which includes light, the radio spectrum, etc. I also include sound waves. The receiver or detector will depend upon the type of control radiation. Thus, if light is used as the control radiation, the counter tubes can be replaced by phototubes, photovoltaic cells, photoconductive cells or other photoconductive means.

I prefer to use one or more pairs of receivers when the control radiation is of the ionization type, in order to balance stray ionization energy such as cosmic rays.

In the embodiments illustrated herein, in which two receivers or detectors are used, the rudder R or other movable controlled member is maintained in its selected position when the receivers or detectors are in a selected condition of equilibrium in which said detectors are equidistant from the source of radiation. This is only one example of a condition of equilibrium, and such condition of equilibrium is not limited to such equidistant positions. Thus, referring to Fig. 1, the respective output currents of the counter tubes 5a and 5 may be regulated by the adjustable resistors 8b and 8a so that unequal currents are delivered to the servo-motors S and Sa, when said counter tubes 5a and 5 are equidistant from source C. In such case, the movable controlled member R is maintained in its selected position and there is a condition of equilibrium, when said counter tubes 5a and 5 are at unequal distances from source C, and their respective control currents balance each other.

As above noted, the magnetic compass may be replaced by a gyroscopic compass or by a gyroscope.

In the illustrated embodiments, the directional means, namely, the magnet or magnets, turn about a vertical axis. Said magnetic means could be mounted to turn about a horizontal axis, in which the normal angle of such magnetic means to the horizontal plane would be determined by the magnetic dip at the respective part of the earth.

In its fundamental form, a gyroscope consists of a rotor which is mounted on a shaft and said rotor is rotated about the axis of said shaft. Said shaft is mounted in a frame, and said frame is connected to a support by a pivot which is perpendicular to said axis of said shaft. The rotor may be fixed to said shaft, or the rotor may turn relative to a non-rotating shaft. When the support is turned relative to said frame around the axis of said pivot, the axis of said shaft is kept in its original selected direction by the action of the rotating rotor. In such case, and as previously noted, the source of radiation may be fixed to said shaft or said source of radiation may be fixed to said frame in any position relative to said shaft and said frame. Said frame corresponds to the housing H. Hence, by using a gyroscope, the counter tube or tubes or other detector or detectors, can be mounted to be shiftable in any plane or direction.

In general, I use radiation means which consist of one or more sources of radiated energy. Such radiation means are exemplified by radium or other radioactive material, which preferably emits gamma rays.

I also use receiver means or detector means, which consist of one or more receivers or detectors, as exemplified by one or more counter tubes.

If the movable controlled member, as exemplified by rudder R, is connected to a moving body, I optionally and preferably apply a biasing force to only one of said means, as exemplified by the biasing force of a magnetic compass or other magnetic field, the biasing force of a gyrocompass or a gyroscope which does not act as a compass, etc. The means to which said biasing force is applied, is optionally and preferably movable in all directions relative to the moving body. The other means, to which said biasing force is optionally and preferably not applied, is movable in unison with the moving body in a selected plane or selected direction.

I use said biasing force to regulate or vary the received energy, and I thus vary an electrical control factor. Said electrical control factor may be a control current or a control voltage. I use said electrical control factor, as one example, to maintain the movable controlled member in selected normal position relative to the moving body. As another example, I use said electrical control factor to change the position of said controlled member relative to the moving body.

If the body is stationary, I can omit said biasing force.

Thus, if the controlled member R is a movable valve or operates a movable valve of a stationary engine, the source C can be fixed to the frame of the engine, and the counter tubes 5a and 5 may be shiftable relative to source C. Such a remote control system, with the omission of a compass biasing force or other type of biasing force, may be applied, as one example, to an engine which is carried on a ship or other moving body.

When I specify that the radiation means and the receiver means are carried on a moving body, such means may be carried on any part of said moving body, including the movable controlled member which is carried by said moving body.

Fig. 6 shows the shielding means movable in unison with the counter tubes. However, the invention is not limited to this feature, because the shielding means may be moved relative to the radiation means or receiving means or both said means. The compass card 3 or equivalent means is designated as the biased member which is operative to control the radiation energy which is received by one or more receivers, or to vary the ratios of the respective radiation energies which are received by one or more receivers. Hence the invention is not limited to a relative movement between one or more radiation sources and one or more receivers.

I have disclosed preferred embodiments of my invention, but numerous changes and omissions and additions and substitutions can be made without departing from its scope.

Thus, I have illustrated electro-mechanical operating means which are coupled directly to the movable member. Said electro-mechanical operating means may operate the valve or valves of a hydraulic motor or other servo-motor which is coupled directly to the movable member.

The operating device of Fig. 5, which includes the armature 159 which is movable in respective opposed directions under the effect of the difference between the respective sets of pulses, is equivalent to respective electro-mechanical operating means which urge or operate the movable member in respective opposed directions.

Also, the invention includes numerous sub-combinations of the main combination disclosed herein.

In effect, the apparatus has a first electric power line which includes the tubes 5, $V_1$, $V_2$ and $V_3$. The apparatus also has a second electric power line which includes the tubes 5a, $V_4$, $V_5$, $V_6$.

Each electric power line is adapted to deliver a respective electric current. These currents are mixed in resistor $R_{13}$ to control the common tube $V_7$. Each electric current is controlled by the respective radiated energy which is received by the respective receiver tube 5 or 5a.

The increase or decrease of the mixed first and second electric currents controls the movement of the rudder or other movable member.

I claim:

1. Control apparatus for actuating a movable member, comprising respective electro-mechanical operating devices respectively coupled to said movable member and operable to move said movable member in respective opposed directions, two counter tubes, said counter tubes being located simultaneously in the path of the ionizing rays which are emitted by a source of ionizing energy, each said counter tube having a respective pair of spaced electrodes and a respective ionizable atmosphere, each said counter tube having a respective source of potential which is applied to the respective pair of electrodes and which is less than the potential which is required to start an ionization current through the respective atmosphere, said ionizing rays being effective to start ionization discharges through said ionizable atmospheres, each said counter tube being connected to a respective electro-mechanical operating device through a respective intermediate circuit, and means for controlling the delivery of said ionizing rays to the respective counter tubes.

2. Control apparatus according to claim 1, in which said ionizing rays are delivered in respective pulses and said counter tubes are self-quenching.

3. Control apparatus according to claim 1, in which said ionizing rays are delivered in respective pulses, said counter tubes are non-quenching, means to limit said ionization discharges to selected equal periods, means to mix said discharges to produce a current which is the difference between said ionization discharges, and a circuit to apply said differences to said electro-mechanical operating devices.

4. Apparatus for actuating a direction-controlling member which is movably connected to a movable body and which is movable in respective opposed shift directions relative to said movable body, said apparatus comprising a first electronic power line which includes a first receiver of radiated energy and which continuously delivers a first output electric current, a second electronic power line which includes a second receiver of radiated energy and which continuously delivers a second output electric current, each said receiver having respective electrodes which are connected to a source of electric receiving power, the conductivity of each said receiver varying in accordance with the amount of radiated energy received thereby, each said power line having respective regulating means associated with and operated by the change in conductivity of the respective receiver to regulate the respective output current in accordance with the respective transient conductivity of the respective receiver, said regulating means of the first power line being adapted and operative to increase the first output electric current when the conductivity of the first receiver is increased, said regulating means of the second power line being adapted and operative to decrease the second output electric current when the conductivity of the second receiver is decreased, a mixer connected to the output ends of said power lines to receive and mix said first and second output electric currents to produce a mixed current which is the sum of said output electric currents, said mixed current being increased when the conductivity of said first receiver is increased and being decreased when the conductivity of said second receiver is increased, first electro-magnetic means carried by said movable body and connected to said direction-controlling member and adapted and operative when activated to move said direction-controlling member relative to said movable body in one of said shift directions, second electro-magnetic means carried by said movable body and connected to said direction-controlling member and adapted and operative when activated to move said direction-controlling member relative to said movable body in the other of said shift-directions, each said electro-magnetic means having a respective electric shift power source which includes a respective grid-controlled electronic control tube, and control means operated by the increase of said mixed current to increase the plate current of one of said electronic control tubes, said control means being operated by the decrease of said mixed current to increase the plate current of the other of said electronic control tubes, a radiating source of radiated energy for said receivers carried by said movable body, said receivers being simultaneously movable relative to said source, movable means carried by said movable body for controlling the reception of radiated energy by said receivers from said source, a source of directional biasing force connected to said movable means and biasing said movable means to normally impinge selected respective radiations from said source upon said receivers, said biasing force having a fixed direction.

5. Apparatus according to claim 4, in which said receivers are counter tubes.

6. Apparatus according to claim 4, in which said control tubes are normally biased to substantial cut-off.

7. Apparatus according to claim 4, in which said receivers are counter tubes and said control tubes are normally biased to substantial cut-off.

8. Apparatus according to claim 4 in which said movable means include a movable support on which said radiation source is mounted and in which said biasing force is a compass force and its source is fixed to said movable support, said receivers being mounted on a second movable support.

9. Apparatus according to claim 4 in which said movable means include a movable support on which said radiation source is mounted and in which said biasing force is a compass force and its source is fixed to said movable support, said receivers being mounted on a second movable support, said supports being turnable about a common axis.

10. Apparatus according to claim 4, which has a signal input line which is connected to both said electronic power lines anterior said mixer, said signal input line being connected and adapted to deliver an electrical signal to both said electronic power lines and to modulate said mixed current.

WINSTON WELLS.

References Cited in the file of this patent

UNITED STATES PATENTS

| Number | Name | Date |
|---|---|---|
| 800,654 | Kitsee | Oct. 3, 1905 |
| 1,999,646 | Wittkuhns | Apr. 30, 1935 |
| 2,085,010 | Dillon | June 29, 1937 |
| 2,102,511 | Chance | Dec. 14, 1937 |
| 2,182,696 | Janeway | Dec. 5, 1939 |
| 2,182,717 | Chance | Dec. 5, 1939 |
| 2,331,698 | Keeler | Oct. 12, 1943 |
| 2,424,193 | Rost et al. | July 15, 1947 |
| 2,441,269 | Hartig | May 11, 1948 |

OTHER REFERENCES

Korff, Electron and Nuclear Counters, D. Van Nostrand Co., 1946, page 168.

Evans et al., Review of Scientific Instruments, November 1939, pp. 339, 341.

Kip et al., Review of Scientific Instruments, September 1946, pp. 323–324.